United States Patent

(12) United States Patent
Langlotz

(10) Patent No.: US 7,145,301 B2
(45) Date of Patent: Dec. 5, 2006

(54) BATTERY OPERATED INDUSTRIAL TRUCK

(75) Inventor: Martin Langlotz, Sparrieshoop (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 11/200,731

(22) Filed: Aug. 10, 2005

(65) Prior Publication Data

US 2006/0043914 A1   Mar. 2, 2006

(30) Foreign Application Priority Data

Aug. 30, 2004   (DE) ................ 10 2004 042 288

(51) Int. Cl.
  *H02P 5/68* (2006.01)
  *B60L 11/18* (2006.01)
(52) U.S. Cl. .............. 318/139; 318/459; 318/504; 318/51
(58) Field of Classification Search ............. 318/139, 318/459, 504, 51, 434; 388/928.1
  See application file for complete search history.

(56) References Cited

U.S. PATENT DOCUMENTS 3,569,809 A * 3/1971 Comer ................ 388/806
4,728,923 A * 3/1988 Finger ................ 340/438
5,005,659 A * 4/1991 Jones et al. ............ 180/65.1
6,962,545 B1* 11/2005 Larkin ................ 475/5
2005/0046192 A1* 3/2005 Rogg ................ 290/10

FOREIGN PATENT DOCUMENTS

DE      43 31 721 A1   3/1994
DE      198 49 0555 A1  4/2000
DE      102 44 769 A1   4/2004

OTHER PUBLICATIONS

Patent Abstracts of Japan, Publication No. 07099704 A, Application No. 05238165 for Power Controller For Electric Vehicle.

* cited by examiner

*Primary Examiner*—Bentsu Ro
(74) *Attorney, Agent, or Firm*—Vidas, Arrett & Steinkraus, P.A.

(57) ABSTRACT

A battery operated industrial truck with at least one first motor and at least one second motor, which are operated by one electric control or regulation device for each motor, which are realised such that the motors can be operated as generators in order to feed back electric energy into the battery, characterised in that a device for switching excess voltage is provided, which in the generator mode of one of the motors temporarily connects the respective other motor to it as a load when a measuring device measures a condition in which an excess voltage occurs or may occur.

7 Claims, 3 Drawing Sheets

BATTERY OPERATED INDUSTRIAL TRUCK

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Battery operated industrial trucks have at least two drive units, i.e. one for the travelling operation and the other one for the lifting/lowering operation of the load support. As driving motors, rotary current motors are mostly used, and the actuation of the at least one driving wheel and that of the load supports takes place either directly by the electric motor, or via a hydraulic unit driven by the electric motor. For the lifting and lowering operation, the electric motor drives a hydraulic pump. For the travelling operation, at least one electric motor drives the driving wheel or several driving wheels directly or via gearings, for instance. Further, it is known since a longer time to regenerate energy in the braking and/or lowering operation of the industrial truck, and to feed it back into the battery. In these cases, (regenerative braking or regenerative lowering, respectively), the electric motors work as generators.

In the operation mode as a generator, excess voltages are generated, depending upon the dimension of the battery, the kind of battery and the amount of back-fed energy. In fact, these excess voltages take place only temporarily, for some seconds, e.g., but can act in a destructive manner for the electronic components of the control or regulation device for the driving motors, or for other components connected to the battery. It is therefore obligatory to provide a protection for this case.

It is known to carry out a kick-off switching in the case of excess voltages. This precaution has the disadvantage that the availability of the industrial truck is decreased. Further, it is conceivable to install a loss resistance for the reduction of excess voltages, along which the destructive energy is dissipated. However, this measure increases the expense for the electronic components.

From DE 102 44 769A it is known to conduct the electric energy, which is generated upon braking down a mobile working machine, to another electric drive.

Thus, the present invention is based on the objective to create a battery operated industrial truck in which excess voltages are reduced in a particularly simple and effective manner.

BRIEF SUMMARY OF THE INVENTION

In the industrial truck according to the invention, a device for switching excess voltage is provided, which in the generator mode of one of the motors temporarily connects the respective other motor to it as a load, when a measuring device measures a condition which is recognised as an excess voltage condition or as a condition in which an excess voltage or may occur. Thus, at each transition of a motor into the generator operation, connection of the other motor can take place in a prophylactic manner, for instance, irrespective of whether an excess voltage is present in fact. For instance, in the device for switching excess voltage, a threshold value for the voltage or for the gradient of the voltage is predetermined, which is above the maximum battery voltage or a maximum gradient. When the threshold value is reached, the respective other motor, which does not work in the generator mode, is connected and driven with a predetermined rotation speed, e.g.

The present invention departs from the finding that in the case of generator operation of one of the motors, in the case of braking, for instance, the respective other motor has not to produce any power output. When lowering a load, the industrial truck is normally standing still or is moved with a relatively slow speed, but is not being braked when doing so, however. Reversely, in the driving operation any load is normally not being lowered upon braking. Through this, the respective other motor which is not in the generator mode of operation, is available as a load for the acceptance of the excess voltage.

The connection of the respective other motor as a load takes place only temporarily for some seconds, until the actually determined excess voltage has fallen down to a lower value or an excess voltage that had to be feared would have been decayed. For this reason, according to one form of realisation of the present invention, the disconnection of the respective other motor takes place when the voltage present on the battery takes a value which is below the threshold value for the excess voltage. However, it has to be taken care that the lower value is as low that it does not exceed the predetermined threshold upon a surge of the voltage after the disconnection of the respective other motor, because otherwise connection of the respective other motor would occur again. This sequence could even be repeated several times again.

When the respective other motor is driven in a rotatory manner, it drives a coupled hydraulic pump. e.g. For this reason, it is provided according to one form of realisation of the present invention that the hydraulic pump is switched to unpressurized operation in the case of excess voltage. Such a condition of operation is per se known for hydraulic units in industrial trucks, however. The load for the motor which is operated in the generator mode produced in doing so is sufficient to decrease the excess voltage in such a degree that electronic components are no more endangered.

An optimum regulation for electric motors, at driving motors for industrial trucks, e.g., consists of a so-called field-oriented regulation. Therewith it is possible to carry out a deliberate subdivision into magnetizing current on the one hand, and momentum-generating current on the other hand. The magnetizing current is a purely reactive current, and the reduction of the excess voltage according to the invention can be performed such that the regulation creates a high magnetizing current for the respective other motor in the case of excess voltage. The magnetizing can be driven up into the saturated condition, the momentum current reaching a value which is no more sufficient for driving the coupled pump in doing so. In this case, the respective other motor acts as a pure inductivity for the temporary acceptance of the excess voltage.

Alternatively, it may also be provided that the control or regulation device of the respective other motor creates a pure direct current for the respective other motor. In this case, the respective other motor acts as an inductivity which is connected with direct current. After a time of transition, the short circuit case is established. However, as the excess voltage is limited to only some seconds, thermal problems that might occur upon longer lasting connected periods do not play any substantial role.

The present invention has some essential advantages. It can be implemented without additional hardware measures, because the described circuitry measures can be realized via the software which is existing anyway, and via the also existing power electronics. As additional hardware is not needed, any additional space for installation is not needed, too. There is also no necessity to reduce the components which generate the excess voltage in their capacity.

BRIEF DESCRIPTION OF SEVERAL VIEWS OF THE DRAWINGS

The invention is explained in more detail below, by means of a realisation example shown in drawings.

DETAILED DESCRIPTION OF THE INVENTION

Figure 1:
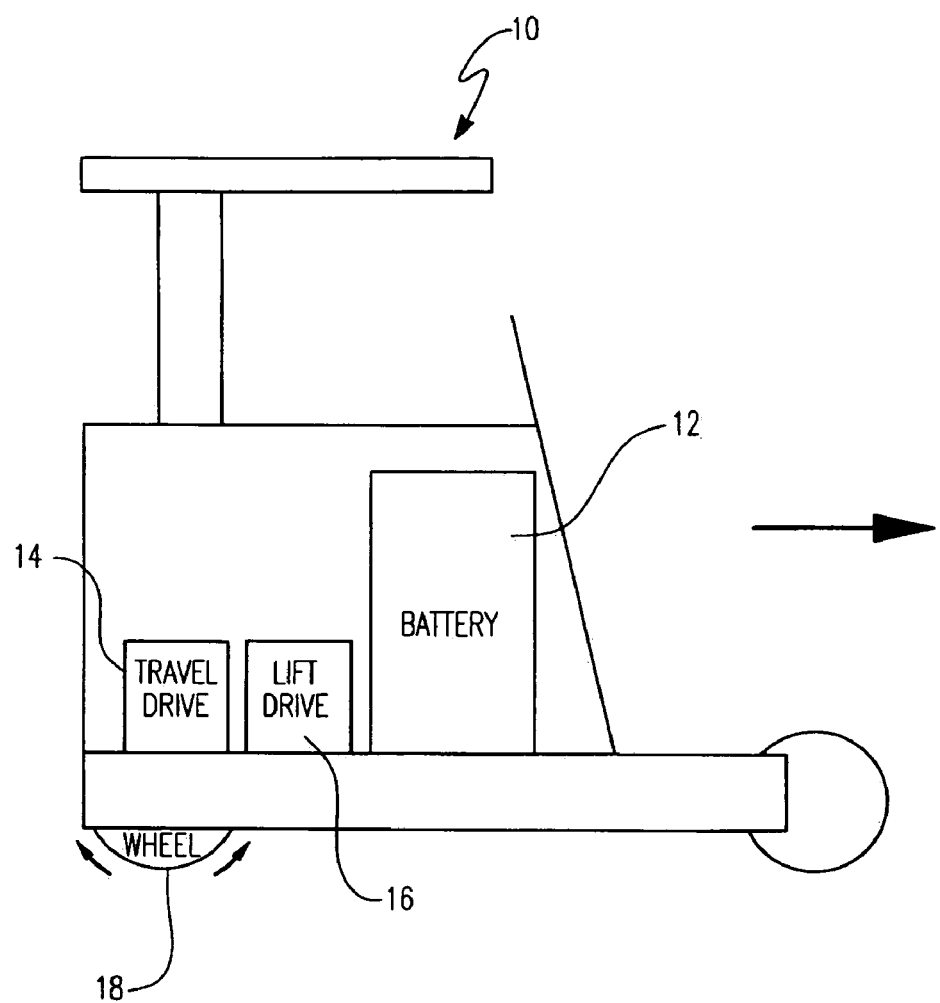
FIG. 1 shows a schematic view of an industrial truck with a precaution according to the invention.

While this invention may be embodied in many different forms, there are described in detail herein a specific preferred embodiment of the invention. This description is an exemplification of the principles of the invention and is not intended to limit the invention to the particular embodiment illustrated In FIG. 1, an industrial truck 10 is schematically indicated, a mast for a height-shiftable load support not being represented in this. The industrial truck is driven by a battery 12, a travelling drive being disposed at 14 and a lifting- and lowering drive at 16. At least one rear wheel 18 serves as a driving wheel. Both drives 14, 16 are also fitted for the operation as a generator, i.e. for the recovery of the braking energy at wheel 18 and of the energy upon braking lowering of the load support and the load.

Figure 2:
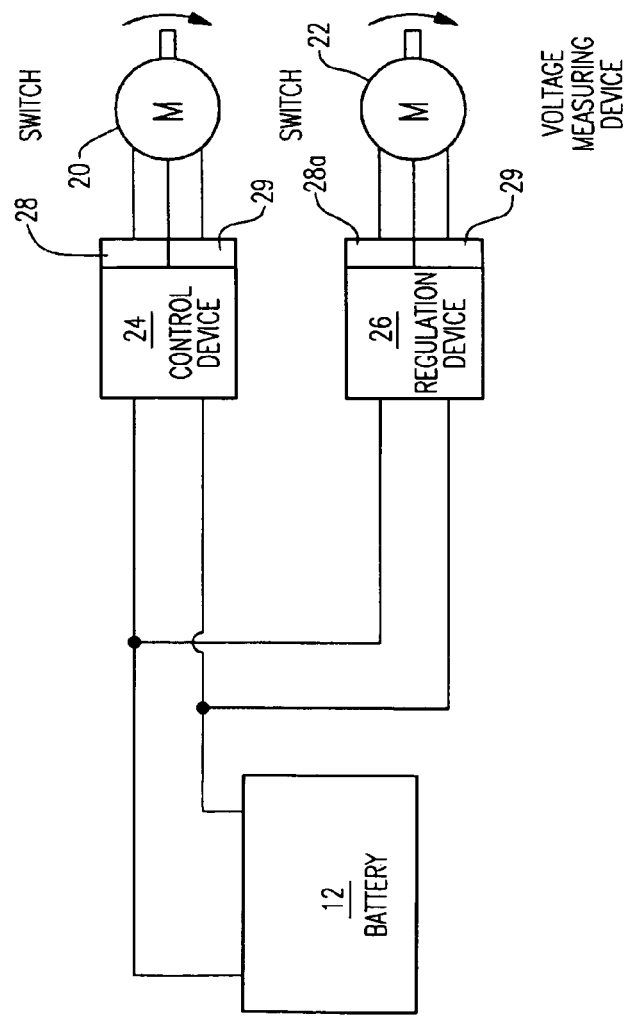
FIG. 2 shows a schematic view of a block diagram of the two drives which are present in the industrial truck.

In FIG. 2, a driving motor 20 for the travelling drive 14 and a driving motor 22 for the lifting- and lowering drive 16 is represented. They are connected to the battery 12 via a control or regulation device 24 or 26, respectively. The motors 20, 22 are represented as rotary current motors, but direct current motors can also be provided. The control or regulation devices 24, 26 are realised such that electric energy is fed into the battery 12 when the motors 20, 22 are operated as generators. In doing so, it may occur that excess voltages appear which destroy the electronic components of the devices 24, 26, as well as further components which are connected to the battery 12.

Not shown voltage measuring devices 29 are assigned to the control or regulation devices 24, 26, which measure the voltage on the terminals of the battery 12. Such voltage measuring devices are usually constituents of such devices 24, 26. Further, a device for switching excess voltage 28, 28a is provided, onto which the signal of the voltage measuring devices is given, respectively. When an excess voltage is detected, the control- and regulation device of the respective other motor is triggered, so that the respective other motor is put into operation. It may drive the assigned pump in the unpressurized operation with a predetermined rotation speed, for instance. However, it is also possible to drive the other motor as a reactive load via the assigned control- and regulation device 24, 26 of the respective other motor 20, 22, by giving it a high magnetizing current via a field-oriented regulation. This connection of the respective other motor constitutes a load for the reduction of the temporarily occurring excess voltage.

The circuitry on the hardware side, as it is usual for such arrangements, namely power electronics and control parts for it, does not need to be changed. Only the software, which is also usually applied, needs an additional program part for the implementation of the switching operations upon occurrence or avoiding of excess voltage.

Figure 3:
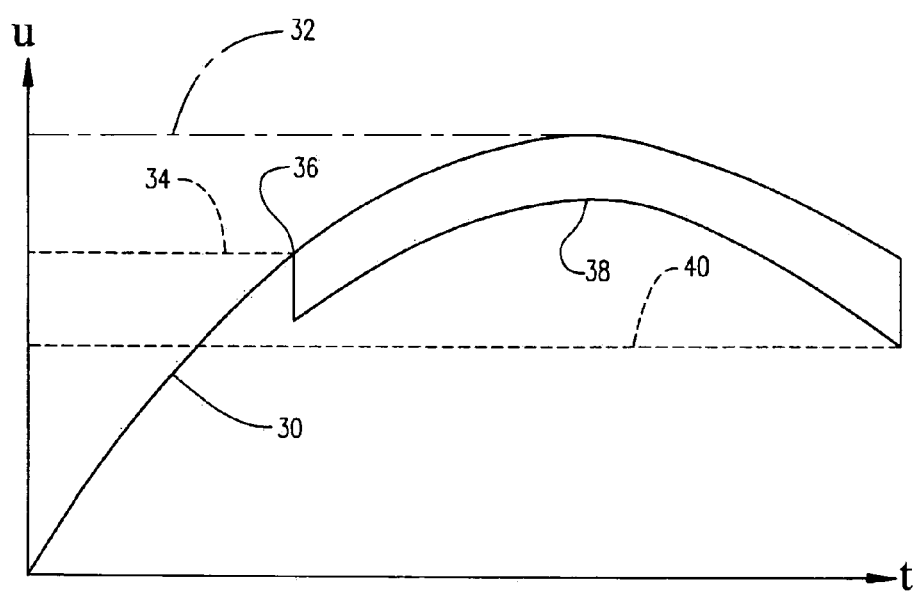
FIG. 3 shows in a diagram the course of an excess voltage.

In FIG. 3, a diagram of the voltage N on the battery is plotted against time. The point of origin approximately corresponds to the maximum battery voltage after complete charging. It is 48 Volts, for instance. At 30, a curve increasing and later decreasing again is shown, which represents the possible course of an excess voltage when one of the motors 20, 22 is operated as a generator. The dash-dotted line 32 is intended to indicate that voltage value which would lead to the destruction of electronic components. According to the invention, a voltage threshold value is predetermined at 34, above which the described switching takes place. This is the case at point 36. The excess voltage is suddenly reduced and it takes the course indicated at 38. One recognises that the maximum of the curve part 38 is situated significantly below the voltage value 32 above which the electronic components are endangered. At a voltage value 40, the disconnection of the connected load takes place, the voltage jumping up again in this. However, the not reduced further course of the curve 30 has reached a value which is below the threshold value 34, so that connecting again is avoided.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A battery operated industrial truck comprising at least one first electric motor and at least one second electric motor, each electric motor being adapted to be operated selectively as a driving motor or as a generator, respectively and each being connected to a common battery through electric control means such that electric energy is fed back into the battery of an electric motor if operated as generator, protection means being provided to protect electric or electronic parts connected to the battery and/or to at least one of the electric motors, against an excess voltage generated by one of the electric motors when operated as a generator, the protection means include voltage measuring means associated with each electric motor, threshold means being provided generating a switching signal for a switching device if the voltage measuring means measure a voltage of the generator operated motor reaching or exceeding a threshold in the threshold means, the switching device being connected such that the generator operated motor is connected to the other electric motor representing the load when the switching signal of the threshold means is generated.

2. The battery operated industrial truck according to claim 1, characterised in that the protection means of the electric control means the first and second electric motors constitute the device for switching excess voltage.

3. The battery operated industrial truck according to claim 1, characterised in that the voltage measuring means measures the generator voltage or the battery voltage or the course (gradient) thereof.

4. The battery operated industrial truck according to claim 1, characterised in that the connection of the respective other electric motor is ended when the voltage applied on the battery takes a value which is below the threshold value (34) far the excess voltage (30).

5. The battery operated industrial truck according to claim 1, characterised in that in the case of excess voltage a pump, driven by the respective other electric motor, is switched to unpressurized operation.

6. The battery operated industrial truck according to claim 1, characterised in that a field-oriented regulation is provided for the electric motors and that the regulation generates a high magnetizing current for the respective other electric motor in the case of excess voltage.

7. The battery operated industrial truck according to claim 1, characterised in that in the electric control means the respective other electric motor, a direct current for the other electric motor is generated.

* * * * *